(12) United States Patent
Kuroki

(10) Patent No.: US 9,559,580 B2
(45) Date of Patent: Jan. 31, 2017

(54) ELECTRIC MOTOR DRIVE APPARATUS HAVING FUNCTION FOR DETECTING WELDING OF ELECTROMAGNETIC CONTACTOR

(71) Applicant: FANUC CORPORATION, Yamanashi (JP)

(72) Inventor: Wataru Kuroki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/841,864

(22) Filed: Sep. 1, 2015

(65) Prior Publication Data
US 2016/0072422 A1 Mar. 10, 2016

(30) Foreign Application Priority Data
Sep. 10, 2014 (JP) .................. 2014-184605

(51) Int. Cl.
*H02P 27/00* (2006.01)
*H02M 1/36* (2007.01)
(Continued)

(52) U.S. Cl.
CPC .............. *H02M 1/36* (2013.01); *H02J 1/00* (2013.01); *H02M 1/32* (2013.01); *H02M 5/4585* (2013.01); *H02M 7/219* (2013.01); *H02P 2201/03* (2013.01)

(58) Field of Classification Search
CPC ......... H02P 8/36; H02P 29/02; H02P 29/0241; H02P 29/027
(Continued)

(56) References Cited

U.S. PATENT DOCUMENTS

| 6,157,097 A * | 12/2000 | Hirose ................. H02M 7/062 307/125 |
| 2010/0079093 A1* | 4/2010 | Kitanaka ................. B60L 3/003 318/400.3 |

(Continued)

FOREIGN PATENT DOCUMENTS

| JP | 3506590 B2 | 3/2004 |
| JP | 2007181885 A | 7/2007 |
| JP | 4121972 B2 | 7/2008 |

OTHER PUBLICATIONS

English Abstract and Machine Translation for Japanese Publication No. 3506590 B2, published Mar. 15, 2004, 25 pgs.
(Continued)

*Primary Examiner* — Eduardo Colon Santana
*Assistant Examiner* — Bickey Dhakal
(74) *Attorney, Agent, or Firm* — Fredrikson & Byron, P.A.

(57) ABSTRACT

An electric motor drive apparatus includes: an AC/DC converter converting AC into DC by the switching of multiple power devices; a control circuit performing PWM switching control of the multiple power devices; a current detecting circuit that detects input current from the AC power supply to the AC/DC converter; an electromagnetic contactor connecting or cutting off power from the AC power supply to the AC converter; and a DC link unit including a smoothing capacitor for smoothing DC voltage, and is constructed such that the control circuit determines that the electromagnetic contactor has been welded when input current is detected in a condition where with the DC link unit having been charged, the electromagnetic contactor is turned off to cut off the power from the AC power supply (Continued)

to the AC/DC converter and the multiple power devices are controlled by PWM switching in accordance with the switching commands.

3 Claims, 7 Drawing Sheets

(51) Int. Cl.
  *H02J 1/00* (2006.01)
  *H02M 1/32* (2007.01)
  H02M 5/458 (2006.01)
  H02M 7/219 (2006.01)
(58) Field of Classification Search
  USPC .......................................... 318/400.22, 783
  See application file for complete search history.

(56) References Cited

U.S. PATENT DOCUMENTS

2010/0246217 A1\* 9/2010 Sakakibara ......... H02M 5/4585
  363/37
2013/0169204 A1\* 7/2013 Kuboe .................. H02M 5/458
  318/400.3

OTHER PUBLICATIONS

English Abstract and Machine Translation for Japanese Publication No. 2007-181885 A, published Jul. 19, 2007, 16 pgs.
English Abstract and Machine Translation for Japanese Publication No. 4121972 B2, published Jul. 23, 2008, 14 pgs.

\* cited by examiner

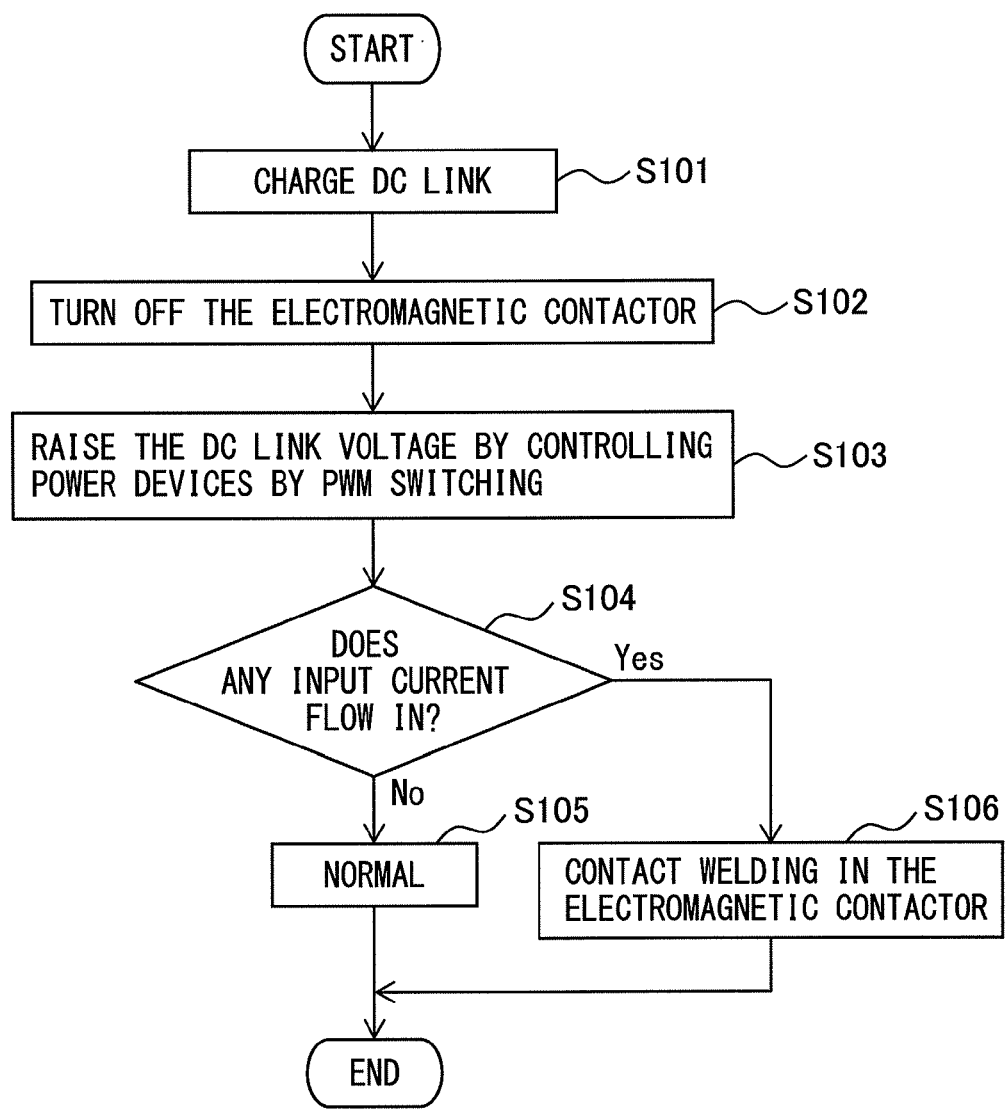

ELECTRIC MOTOR DRIVE APPARATUS HAVING FUNCTION FOR DETECTING WELDING OF ELECTROMAGNETIC CONTACTOR

BACKGROUND OF THE INVENTION

1. Field of the Invention

The present invention relates to an electric motor drive apparatus, and in particular to an electric motor drive apparatus having a function of detecting whether or not an electromagnetic contactor for connecting and cutting off power supply has been welded, using an AC/DC converter for converting input AC voltage to DC voltage.

2. Description of the Related Art

There is a known method in the field of electric motor control apparatuses for driving machine tools, industrial machines, robots, etc., in which an electromagnetic contactor is installed in the input power line, and is turned off in order to isolate the electric motor control apparatus from the power supply when an emergency stop or an alarm occurs, to thereby stop the supply of energy from the power supply and suspend the operation of the electric motor (e.g., Published Japanese Patent No. 3506590 (JP 3506590 B)).

According to this conventional method, there is a risk that when an excessive current flows through the electromagnetic contactor, the contacts are welded, and therefore the electromagnetic contactor is unable to cut off the connection between the power supply and the electric motor control apparatus. To deal with this, it is a common that when a weld in the electromagnetic contactor occurs it is checked by monitoring auxiliary contacts of the electromagnetic contactor by turning on and off the contactor in a state where the machine is suspended without consuming energy (e.g., Published Japanese Patent Application Laid-open No. 2007-181885 (JP 2007-181885 A)).

FIG. 1 shows a block diagram of a conventional electric motor drive apparatus. A conventional electric motor drive apparatus 1000 includes an AC/DC converter 101 for converting three-phase (R-phase, S-phase, T-phase) alternate current (AC) voltage supplied from an AC power supply 20 via a reactor 108 into direct current (DC) voltage; a smoothing capacitor 105 for smoothing DC voltage; and a DC/AC converter 110 for converting DC voltage to AC voltage for driving an electric motor 30. Interposed between the AC power supply 20 and the AC/DC converter 101 is an electromagnetic contactor 104. The electromagnetic contactor 104 is turned off at emergency stop or at the time of alarm generation to separate the motor control apparatus 1000 from the AC power supply 20 and stop energy supply from the AC power supply 20 to the motor control apparatus 1000.

The AC/DC converter 101 includes a plurality of power devices Tr1 to Tr6 and a plurality of diodes D1 to D6 connected in inverse parallel with these devices. The multiple power devices Tr1 to Tr6 are controlled by PWM switching in accordance with switching commands from a control circuit 102. The electromagnetic contactor 104 has auxiliary contacts 201, the presence or absence of a weld in the electromagnetic contactor 104 is detected by a detecting circuit 202. The result of detection of the presence or absence of a weld by the detecting circuit 202 is transmitted to a weld detection determining circuit 203, from which the determination result on electromagnetic contactor welding, i.e., whether or not the electromagnetic contactor 104 has been welded, is output.

There is a known device which includes a booster circuit arranged between a relay and an inverter, a capacitor connected in parallel with the inverter and a means of detecting voltage across the terminals of the capacitor, and determines that a weld of the relay is occurring if the terminal voltage of the capacitor is higher than that before boosting when the output from the booster circuit has been increased to the maximum set voltage with the relay opened (e.g., Published Japanese Patent No. 4121972 (JP 4121972 B)). However, it is necessary in this method to hold the value of the DC link voltage before boosting and the trouble of boosting the output to the maximum set voltage.

As above, in the conventional technologies, the electromagnetic contactor equipped with auxiliary contacts is needed, and an additional circuit such as a detecting circuit, a weld detection determining circuit or the like needs to be provided, externally or in the electric motor drive apparatus, in order to monitor the auxiliary contacts, which leads to increased costs.

SUMMARY OF THE INVENTION

It is therefore an object of the present invention to provide an electric motor drive apparatus that can achieve checking of a weld without an increase in cost, by making use of an input current detecting circuit, a control circuit for giving switching commands to power devices and an AC/DC converter circuit including power devices that can be controlled by PWM switching in accordance with the switching commands, all of which are originally equipped in the motor control apparatus, without the need of auxiliary contacts or additional circuits for an electromagnetic contactor.

An electric motor drive apparatus according to one embodiment of the present invention includes: an AC/DC converter that includes a plurality of power devices, and converts AC voltage supplied from an AC power supply into DC voltage by switching of the multiple power devices; a control circuit that performs PWM switching control of the multiple power devices in accordance with switching commands; a current detecting circuit that detects input current from the AC power supply to the AC/DC converter; an electromagnetic contactor that connects or cuts off the supply of power from the AC power supply to the AC converter; and, a DC link unit including a smoothing capacitor for smoothing DC voltage output from the AC/DC converter, and wherein the control circuit determines that the electromagnetic contactor has been welded when input current is detected in a condition where with the DC link unit having been charged the electromagnetic contactor is turned off to cut off the supply of power from the AC power supply to the AC/DC converter and the multiple power devices are controlled by PWM switching in accordance with the switching commands from the control circuit.

BRIEF DESCRIPTION OF THE DRAWINGS

The object, features and advantages of the present invention will be better understood by reading the following description of the embodiments, taken together with the drawings wherein:

FIG. 5 is a flow chart for explaining a sequence of detecting the presence or absence of a weld in an electromagnetic contactor by means of an electric motor drive apparatus according to the first embodiment of the present invention;

DETAILED DESCRIPTION

Figure 1:
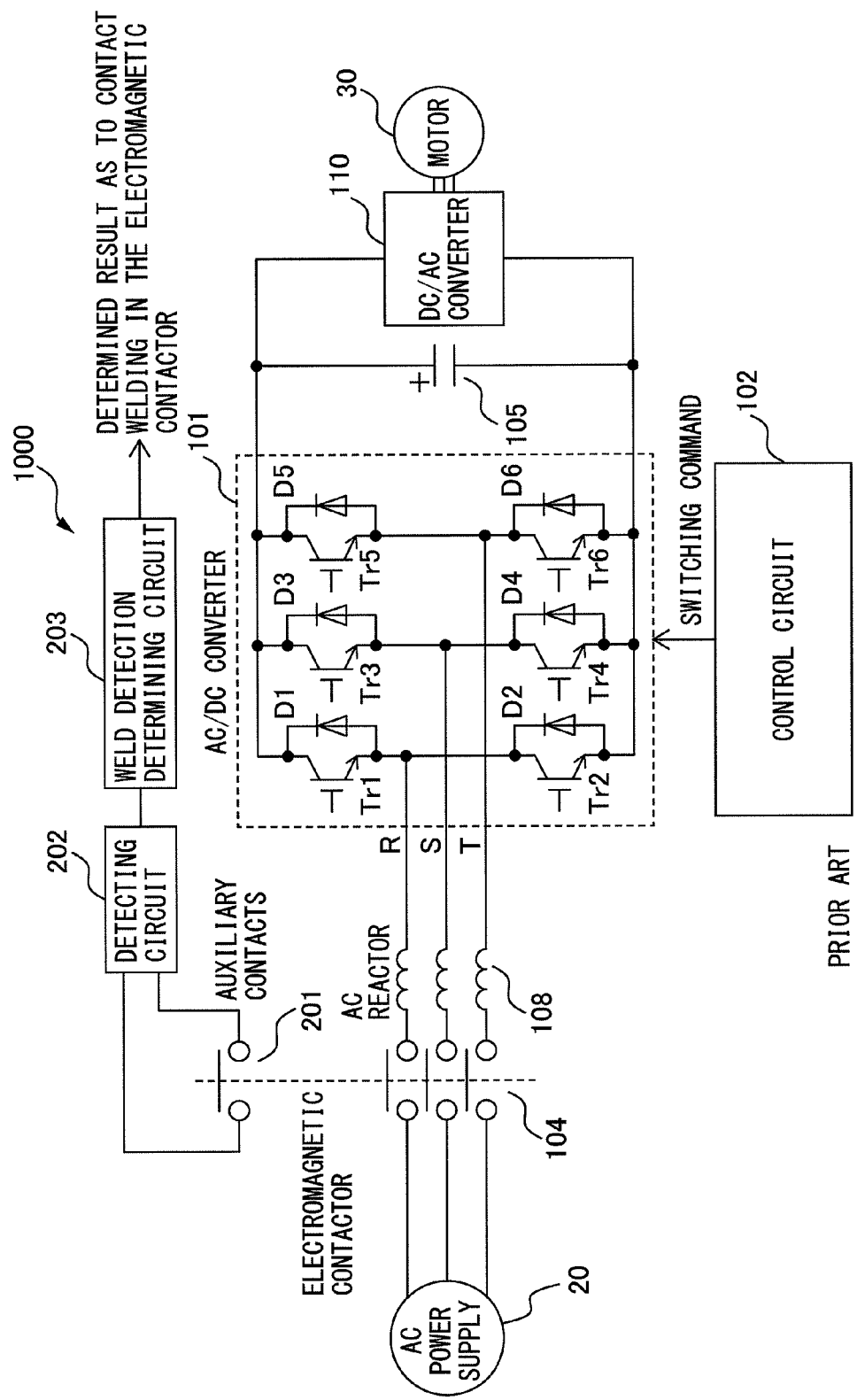
FIG. 1 is a block diagram showing a conventional electric motor drive apparatus.

Referring to the drawings, the electric motor drive apparatuses according to the present invention will be described. However, it should be noted that the technical scope of the present invention is not limited by the embodied mode of these but embraces the inventions defined by the claims and their equivalence.

First Embodiment

Figure 2:
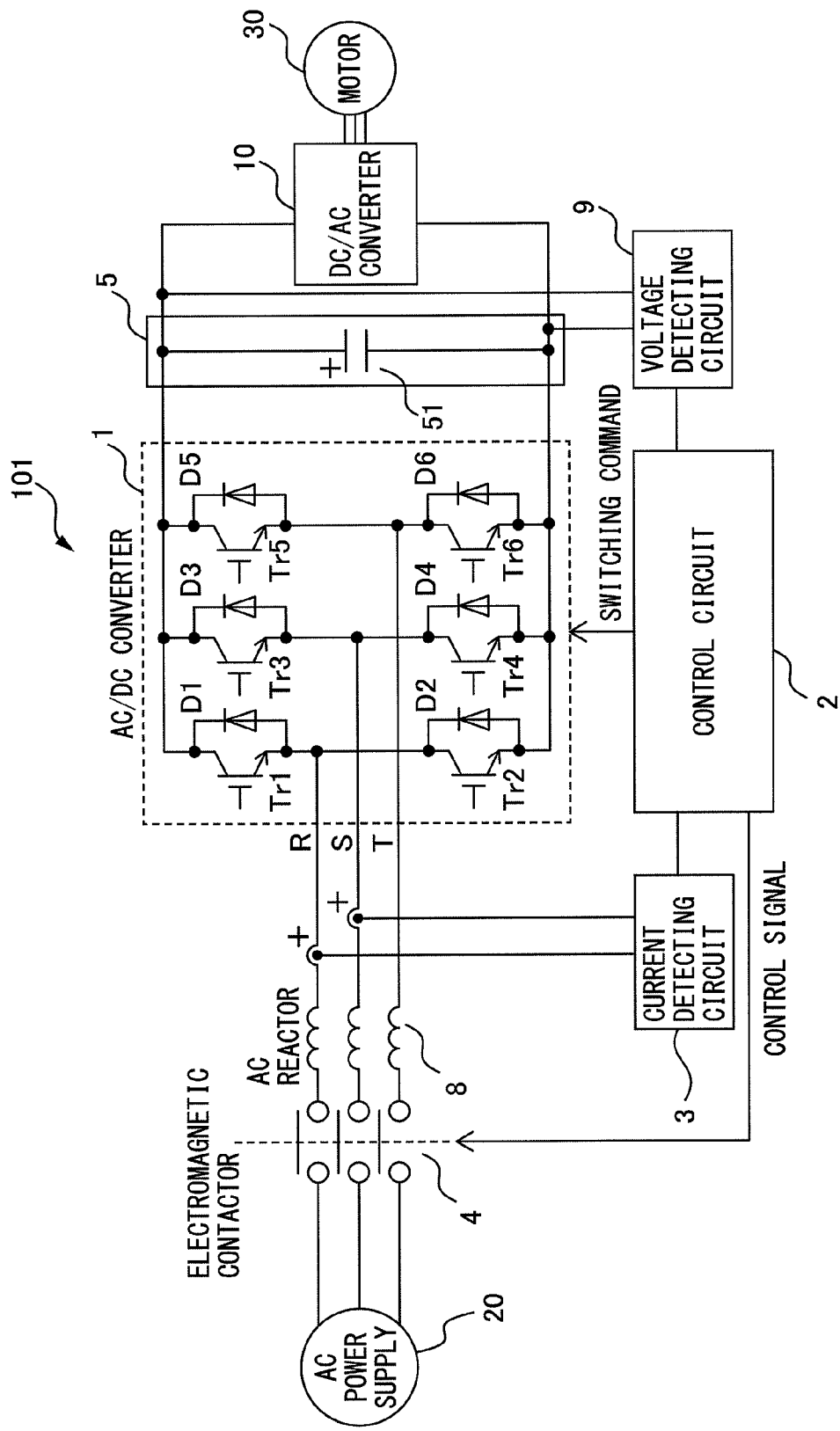
FIG. 2 is a block diagram showing an electric motor drive apparatus according to a first embodiment of the present invention.

An electric motor drive apparatus according to a first embodiment of the present invention will be described with reference to the drawings. FIG. 2 is a block diagram showing an electric motor drive apparatus according to the first embodiment of the present invention. An electric motor drive apparatus 101 according to the first embodiment of the present invention includes a plurality of power devices Tr1 to Tr6. The electric motor drive apparatus includes: an AC/DC converter 1 that converts AC voltage supplied from an AC power supply 20 into DC voltage by switching of the multiple power devices; a control circuit 2 that performs PWM switching control of the multiple power devices Tr1 to Tr6 in accordance with switching commands; a current detecting circuit 3 that detects input current from the AC power supply 20 to the AC/DC converter 1; an electromagnetic contactor 4 that connects or cuts off supply of power from the AC power supply 20 to the AC converter 1; and a DC link unit 5 including a smoothing capacitor 51 for smoothing DC voltage output from the AC/DC converter 1. In this electric motor drive apparatus, the control circuit 2 determines that the electromagnetic contactor 4 has been welded when input current is detected in a condition where with the DC link unit 5 having been charged the electromagnetic contactor 4 is turned off to cut off the supply of power from the AC power supply 20 to the AC/DC converter 1 and the multiple power devices Tr1 to Tr6 are controlled by PWM switching in accordance with the switching commands from the control circuit 2.

The electromagnetic contactor 4 is provided between the AC power supply 20 and the AC/DC converter 1 to perform switching for the connection and cutoffs of the connection between the AC/DC converter 1 and the AC power supply 20. In normal conditions, the electromagnetic contactor 4 is set with its contacts isolated by the force of a spring. When the coil of the electromagnetic contactor 4 is energized, an attractive force greater than the spring force is created by the electromagnet so that the contacts are connected. By cutting off supply of power to the coil of electromagnetic contactor 4, the contacts are separated by the spring force. This switching operation of connection and cutoff of the electromagnetic contactor 4 is performed in accordance with the commands (control signals) from the control circuit 2. Herein, an AC reactor 8 is arranged between the electromagnetic contactor 4 and the AC/DC converter 1.

The AC/DC converter 1 is a converter for converting AC voltage into DC voltage. The AC/DC converter 1 includes a plurality of power devices, e.g., six semiconductor switching devices Tr1 to Tr6, which are connected in inverse parallel with diodes D1 to D6 (six diodes), respectively. Switching of the semiconductor switching devices Tr1 to Tr6 is performed based on switching commands from the control circuit 2.

The DC voltage output from AC/DC converter 1 is smoothed by the smoothing capacitor 51 provided in the DC link unit 5.

The DC voltage smoothed by the DC link unit 5 is converted into AC voltage for driving the electric motor 30 by DC/AC converter 10. An inverter can be used as the DC/AC converter 10.

A voltage detecting circuit 9 measures the voltage between the terminals of the DC link unit 5 and transmits the detection result to the control circuit 2.

In the electric motor drive apparatus according to the embodiment, while the electromagnetic contactor 4 is turned off with the DC link unit 5 having been charged by the AC/DC converter 1, power devices Tr1 to Tr6 are PWM-switched in accordance with switching commands from the control circuit 2 to test whether the voltage across DC link unit 5 increases. In this operation, if there is no weld in the electromagnetic contactor 4, no input current for raising the voltage across the DC link unit 5 flows into AC/DC converter 1, so that the voltage across the DC link unit 5 lowers. In contrast, if there is a weld in the electromagnetic contactor 4, input current for raising the voltage across the DC link unit 5 flows from the AC power supply 20 to AC/DC converter 1 by PWM switching. Therefore, it is possible to determine whether there is a weld in the electromagnetic contactor 4 by comparing levels of input current. Alternatively, the electromagnetic contactor 4 can be determined to have been welded when the input current, which would flow if the electromagnetic contactor is welded, is compared to a predetermined reference value and if it is equal to or higher than the reference value.

Figure 3A:
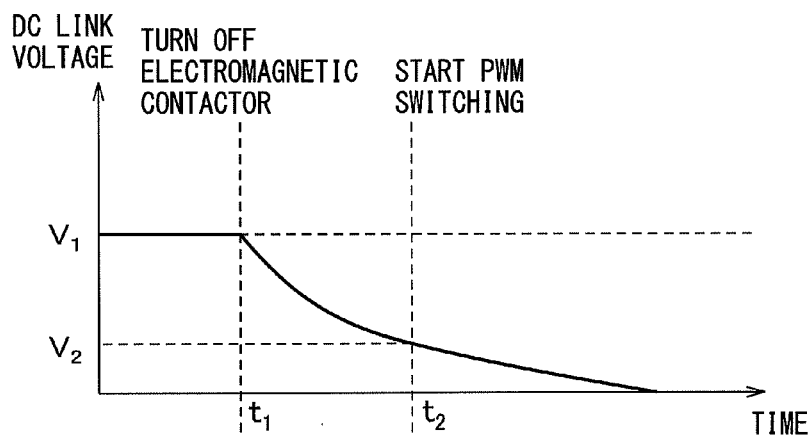
FIG. 3A is a graph showing time-dependent change of the voltage across a DC link unit in an electric motor drive apparatus according to the first embodiment of the present invention when no weld is present in an electromagnetic contactor.
Figure 3B:
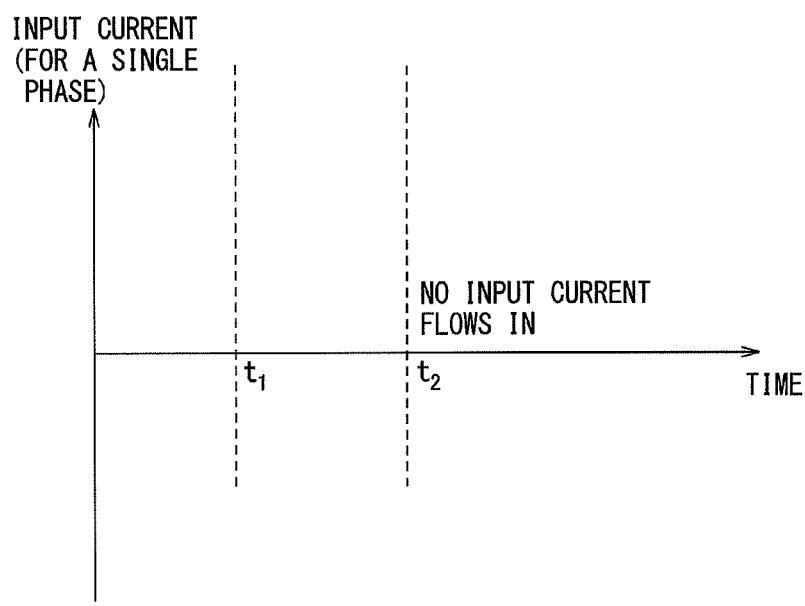
FIG. 3B is a graph showing time-dependent change of the input current flowing from an AC power supply to an AC/DC converter in an electric motor drive apparatus according to the first embodiment of the present invention when no weld is present in an electromagnetic contactor.

Next, in the embodiment, the method of determining whether there is a weld in the electromagnetic contactor 4 will be described in detail. To begin with, a description will be made of the time-dependent changes of the voltage across DC link unit 5 and the input current from the AC power supply 20 to the AC/DC converter 1 when there is no weld in the electromagnetic contactor 4. FIG. 3A shows time-dependent change of the DC voltage when no weld is present in the electromagnetic contactor in the electric motor drive apparatus according to the first embodiment of the present invention. FIG. 3B shows time-dependent change of the input current flowing from the AC power supply to the AC/DC converter when no weld is present in the electromagnetic contactor.

It is assumed in FIG. 3A that the control circuit 2 sends a control signal for tuning off the electromagnetic contactor 4 at time $t_1$ after DC link unit 5 has been charged, and sends a switching command at time $t_2$ to start PWM switching of the power devices in the AC/DC converter 1. In this condition, if no weld exists in the electromagnetic contactor 4, the smoothing capacitor 51 in DC link unit 5 discharges naturally. The voltage across DC link unit 5 decreases with time from $V_1$ at time $t_1$ to $V_2$ at time $t_2$. On the other hand, as shown in FIG. 3B, no current flows when PWM switching of the power devices in the AC/DC converter 1 is started at time $t_2$. From this result it is understood that the AC power supply 20 and AC/DC converter 1 are separated, and therefore it is possible to determine that no weld is occurring in the electromagnetic contactor 4.

Figure 4A:
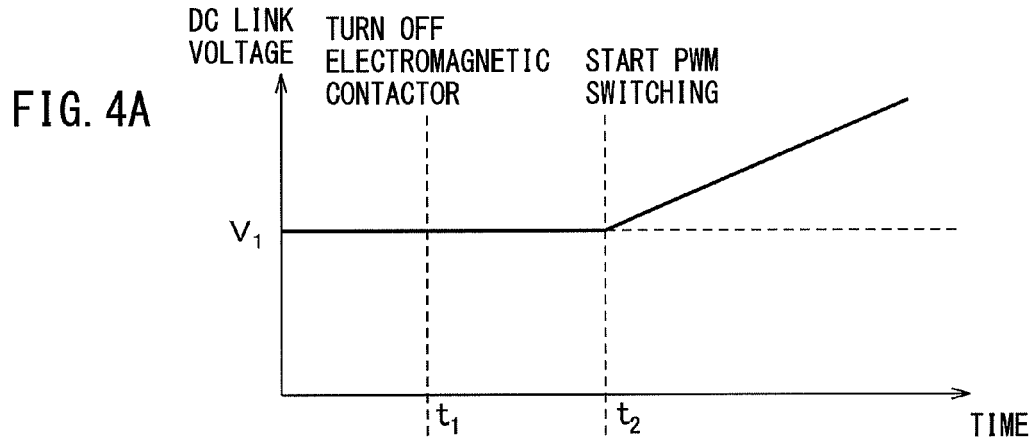
FIG. 4A is a graph showing time-dependent change of the voltage across a DC link unit in an electric motor drive apparatus according to the first embodiment of the present invention when a weld is present in an electromagnetic contactor.
Figure 4B:
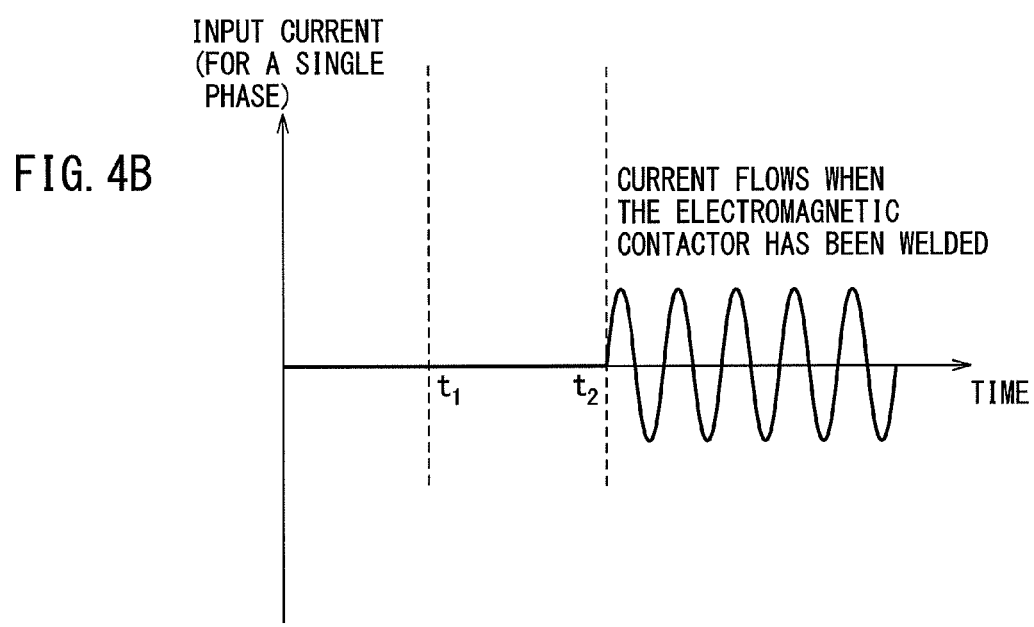
FIG. 4B is a graph showing time-dependent change of the input current flowing from a AC power supply to an AC/DC converter in an electric motor drive apparatus according to the first embodiment of the present invention when a weld is present in an electromagnetic contactor.

The next description will be made on the time-dependent changes of the voltage across DC link unit 5 and the input current from the AC power supply 20 to the AC/DC converter 1 when there is a weld in the electromagnetic contactor 4. FIG. 4A shows time-dependent change of the DC voltage when a weld is present in the electromagnetic contactor in the electric motor drive apparatus according to the first embodiment of the present invention. FIG. 4B shows time-dependent change of the input current flowing from the AC power supply to the AC/DC converter when contact welding is present in the electromagnetic contactor.

In FIG. 4A, when there is a weld in the electromagnetic contactor 4, the smoothing capacitor 51 in the DC link unit 5 continues to be charged from the AC power supply 20 after the electromagnetic contactor 4 is turned off at time $t_1$, so that decrease of the DC link voltage due to self-discharge is compensated. As a result, the voltage $V_1$ across the DC link unit 5 at time $t_1$ will not practically decrease at time $t_2$ at which PWM switching of the power devices in the AC/DC converter 1 is started. Further, after time $t_2$ the voltage across the DC link unit 5 increases with time by PWM switching of the power devices in the AC/DC converter 1. On the other hand, as shown in FIG. 4B, when PWM switching of the power devices in the AC/DC converter 1 is started at time $t_2$, input current from the AC power supply 20 to the AC/DC converter 1 is detected.

In this way, when PWM switching of the power devices in the AC/DC converter 1 is started at time $t_2$, the current detecting circuit 3 (see FIG. 2) detects the input current from the AC power supply 20 to the AC/DC converter 1 and transmits the detected result to the control circuit 2. The control circuit 2, based on the detected result from the current detecting circuit 3, can determine that the electromagnetic contactor 4 has been welded.

Though time-dependent change of input current for a single phase is shown in FIGS. 3B and 4B, any of R-phase, S-phase and T-phase currents may be detected. Further, detection of input current is not limited to current for a single phase, but currents for two phases, or currents for three phases may be detected.

Further, though FIG. 2 shows an example where the current detecting circuit 3 detects input currents flowing to R-phase and S-phase, the embodiment should not be limited to this. Any one of R-phase, S-phase and T-phase may be detected, two phases other than R-phase or S-phase may be detected, or input currents for three phases may be detected.

Next, the operation sequence of the electric motor drive apparatus circuit according to the first embodiment of the present invention will be described using a flow chart in FIG. 5. First, at Step S101 the control circuit 2 sends out a control signal for turning on the electromagnetic contactor 4 to connect the AC power supply 20 and AC/DC converter 1 and thereby charge the DC link unit 5. Specifically, the smoothing capacitor 51 provided for the DC link unit 5 is charged.

Next, at Step S102 the control circuit 2 transmits a command of turning off the electromagnetic contactor 4 to perform an operation of cutting off the connection between the AC power supply 20 and the AC/DC converter 1. At this point, if the electromagnetic contactor 4 operates normally, or when the electromagnetic contactor 4 has not been welded, the electromagnetic contactor 4 is cut off so that supply of AC power from the AC power supply 20 to AC/DC converter 1 stops. On the other hand, when the electromagnetic contactor 4 has been welded, the electromagnetic contactor 4 fails to be cut off, supply of AC power from the AC power supply 20 to AC/DC converter 1 continues.

Next, at Step S103 the control circuit 2 transmits a switching command so as to perform PWM switching of the power devices in the AC/DC converter 1, whereby the voltage across the DC link unit 5 (DC link voltage) is raised.

Next, at Step S104 the current detecting circuit 3 detects the input current from the AC power supply 20 to AC/DC converter 1, and transmits the detected result to the control circuit 2, which in turn determines whether or not an input current flows from the AC power supply 20 to AC/DC converter 1.

When the control circuit 2 determines at Step S104 that no input current flows in, the control circuit 2 determines at Step S105 that the electromagnetic contactor 4 is in normal conditions or no contact welding is taking place in the electromagnetic contactor 4.

On the other hand, when the control circuit 2 determines at Step S104 that input current is flowing in, the control circuit 2 determines at Step S106 that the electromagnetic contactor 4 has been welded.

As described above, according to the electric motor drive apparatus of the first embodiment of the present invention, it is possible to determine the presence or absence of a weld in the electromagnetic contactor by transmitting a command of turning off the electromagnetic contactor after charging the DC link unit by turning on the electromagnetic contactor, and checking whether or not input current flows from the AC power supply to the AC/DC converter when PWM switching control of the power devices in the AC/DC converter is performed.

Second Embodiment

Figure 6:
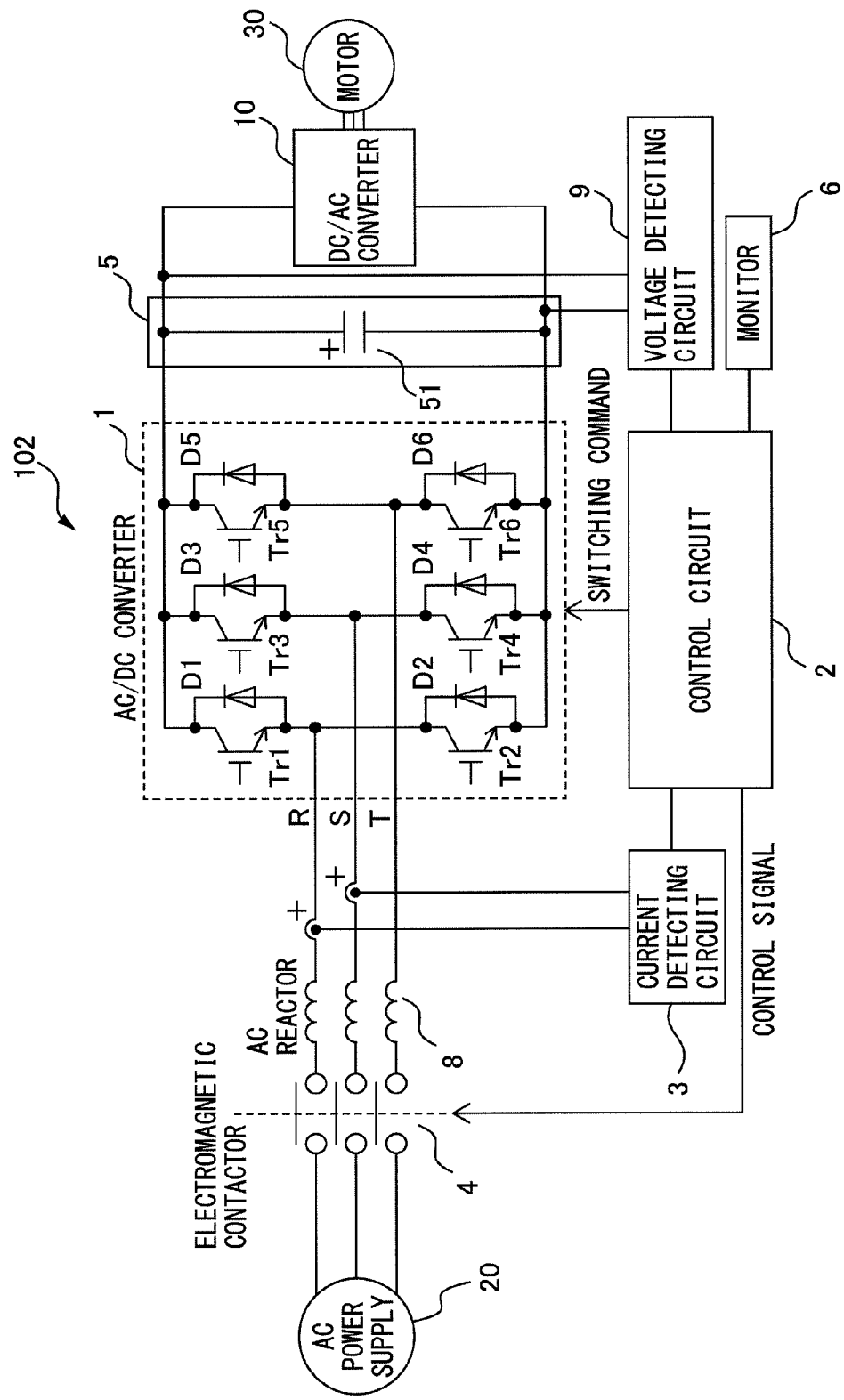
FIG. 6 is a block diagram showing an electric motor drive apparatus according to a second embodiment of the present invention; and, FIG. 7 is a block diagram showing an electric motor drive apparatus according to a third embodiment of the present invention.

Next, an electric motor drive apparatus of a second embodiment of the present invention will be described with reference to the drawings. FIG. 6 is a block diagram showing an electric motor drive apparatus according to the second embodiment of the present invention. In addition to the electric motor drive apparatus 101 according to the first embodiment, the electric motor drive apparatus 102 according to the second embodiment of the invention further includes a monitor 6 for displaying the determined result as to contact welding, or whether or not the electromagnetic contactor 4 has been welded. Other components of the electric motor drive apparatus 102 of the second embodiment are the same as those of the electric motor drive apparatus 101 of the first embodiment, so the detailed description is omitted.

By displaying the determined result of the control circuit 2 as to whether or not the electromagnetic contactor 4 has been welded on the monitor 6, it is possible to quickly inform the user of the presence or absence of a weld in the electromagnetic contactor 4. The monitor 6 may employ a liquid crystal display device, organic EL display device and the like. However, not limited to these, display devices using other display methods may also be used.

Third Embodiment

Figure 7:
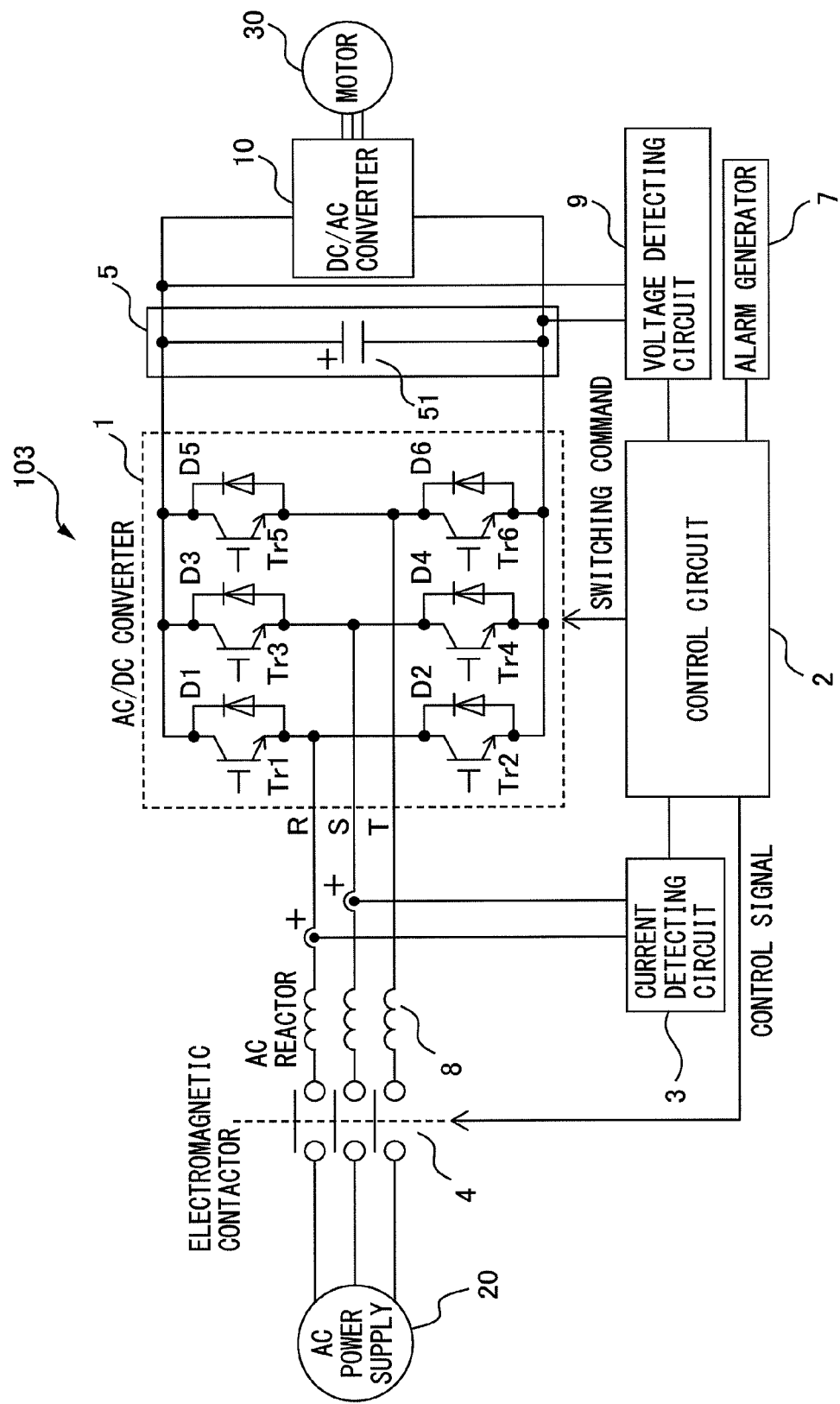

Next, an electric motor drive apparatus of a third embodiment of the present invention will be described with reference to the drawings. FIG. 7 is a block diagram showing an electric motor drive apparatus according to the third embodiment of the present invention. In addition to the electric motor drive apparatus 101 according to the first embodiment, the electric motor drive apparatus 103 according to the third embodiment of the invention further includes an alarm generator 7 for generating an alarm when the electromagnetic contactor 4 is determined to have been welded, and the control circuit 2 stops the operation of the electric motor 30 when an alarm has been generated. Other components of the electric motor drive apparatus 103 of the third embodiment are the same as those of the electric motor drive apparatus 101 of the first embodiment, so the detailed description is omitted.

The control circuit 2 causes the alarm generator 7 to generate an alarm when occurrence of a weld in the electromagnetic contactor 4 is determined, whereby it is possible to quickly deal with contact welding in the electromagnetic contactor 4. As the alarm generating means, alarm sounds and luminous alarms with lamps may be considered. However, not limited to these, other means can be used to generate an alarm.

Further, since the control circuit 2 stops the operation of the electric motor 30 when an alarm is generated, it is possible to shorten the time from detection of contact welding in the electromagnetic contactor 4 to stoppage of the electric motor 30, hence minimize the influence on the electric motor 30 due to contact welding of the electromagnetic contactor 4.

Since the electric motor drive apparatus of one embodiment of the present invention does not need to use an electromagnetic contactor equipped with auxiliary contacts or an additional detecting circuit either, it is possible to check contact welding of the electromagnetic contactor without any cost increase.

What is claimed is:

1. An electric motor drive apparatus comprising:
an AC/DC converter including a plurality of power devices, and converts AC voltage supplied from an AC power supply into DC voltage by switching of the plurality of power devices;
a control circuit configured to perform PWM switching control of the plurality of power devices in accordance with switching commands;
a current detecting circuit configured to detect input current from the AC power supply to the AC/DC converter;
an electromagnetic contactor configured to connect or cut off the supply of power from the AC power supply to the AC/DC converter; and,
a DC link unit including a smoothing capacitor for smoothing DC voltage output from the AC/DC converter;
wherein the control circuit determines that the electromagnetic contactor has been welded when input current is detected in a condition where with the DC link unit having been charged, when the electromagnetic contactor is on, the electromagnetic contactor is turned off to cut off the supply of power from the AC power supply to the AC/DC converter and the plurality of power devices are controlled by PWM switching in accordance with the switching commands from the control circuit to test whether the input current from the AC power supply to the AC/DC converter increases when the electromagnetic contactor is cut off.

2. The electric motor drive apparatus according to claim 1, further including a monitor for displaying the result of determination as to contact welding, indicating whether or not the electromagnetic contactor has been welded.

3. The electric motor drive apparatus according to claim 1, further including an alarm generator for generating an alarm when the electromagnetic contactor is determined to have been welded, wherein
the control circuit stops the operation of the electric motor when an alarm has been activated.

* * * * *